Nov. 7, 1967   B. E. PITCHES ETAL   3,350,935
AIRFLOW DIRECTION INDICATORS
Filed March 12, 1965   2 Sheets-Sheet 1

Inventors
B. E. PITCHES
D. HOPE
By Cameron, Kerkam & Sutton
Attorneys

Nov. 7, 1967  B. E. PITCHES ETAL  3,350,935
AIRFLOW DIRECTION INDICATORS
Filed March 12, 1965  2 Sheets-Sheet 2
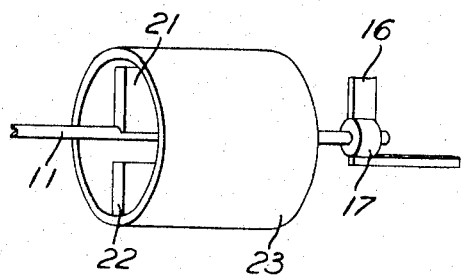
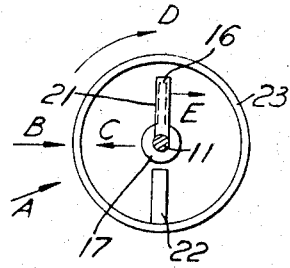
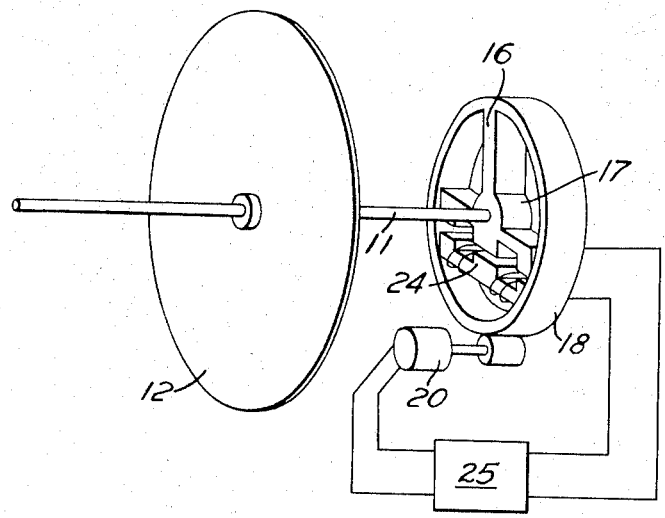
Inventors
B. E. PITCHES
D. HOPE
By
Cameron, Kerkam & Sutton
Attorneys

United States Patent Office 3,350,935
Patented Nov. 7, 1967

3,350,935
AIRFLOW DIRECTION INDICATORS
Brian Edward Pitches, Balerno, and Donald Hope, Edinburgh, Scotland, assignors to Ferranti, Limited, Lancashire, England, a company of Great Britain and Northern Ireland
Filed May 12, 1965, Ser. No. 455,127
Claims priority, application Great Britain, May 13, 1964, 19,873/64
7 Claims. (Cl. 73—188)

ABSTRACT OF THE DISCLOSURE

An airflow direction indicator having a resiliently mounted probe and means for restraining the probe to restrict the deflection of the probe in one plane only. The restraining means, and hence the direction of deflection or the plane containing the component of drag force of the airstream, may be rotated as to completely nullify any probe deflection and the angular position of the restraining means relative to a datum position indicates the direction of flow of the airstream.

---

This invention relates to airflow direction indicators primarily, though not exclusively, for use with aircraft stall-warning systems.

According to the present invention there is provided an airflow direction indicator which includes a probe member extending into the airstream substantially perpendicular thereto and resiliently mounted so as to be capable of limited deflectional movement under the influence of the drag force of the airstream, and measuring apparatus operable to determine the direction of action of said drag force.

According to a first embodiment of the invention the probe member is free to deflect in the direction of action of the drag force, and the measuring apparatus measures the angle between this direction and a datum direction.

According to a preferred embodiment the deflection of the probe member is restricted to a single plane containing a component of the drag force, and the indicator includes means arranged to rotate this plane to a position in which the deflection of the probe is nullified, the measuring apparatus being arranged to measure the angle between this plane in the null position and a datum direction. In the null position the plane in which the probe may deflect is perpendicular to the direction of the airflow.

The invention will now be described, by way of example, with reference to the accompanying drawings, in which:

FIGURE 3 shows a damping arrangement for use, with the mechanism of FIGURE 2;

FIGURE 4 is an end elevational view of the damping arrangement of FIGURE 3; and

FIGURE 5 shows an alternative form of pick-off for use with the embodiment of FIGURE 2.

Figure 1:
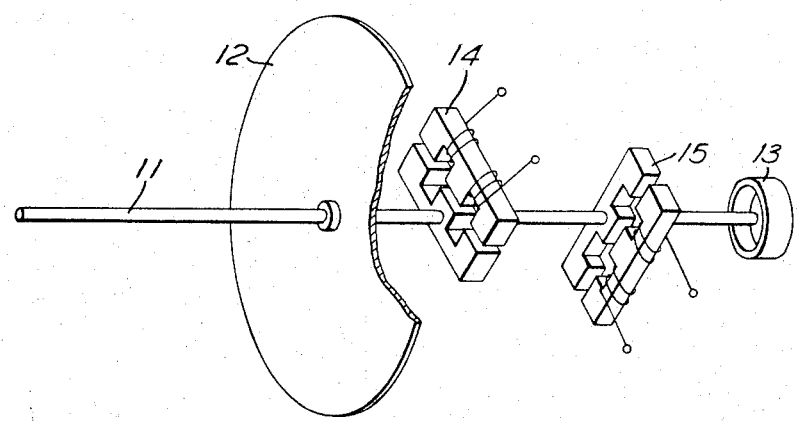
FIGURE 1 shows, in schematic form, the arrangement according to the first embodiment.

Referring now to FIGURE 1, a cylindrical probe member 11 is secured to a flexible diaphragm 12 which is fastened across a hole in the fuselage of an aircraft. The free end of the probe member 11 extends into the airstream, and the other end projects through a fixed constraining ring 13. Fastened to the inner end of the probe are two variable reluctance pick-offs 14 and 15, arranged to measure movement of the probe in two mutually perpendicular directions.

In operation the free end of the probe member 11 is deflected by the drag force of the airstream in the direction of action of those forces. The two pick-offs 14 and 15 resolve the deflection into two perpendicular components, from which the actual direction of deflection can be deduced. The constraining ring 13 prevents excessive movement of the probe.

Alternative pick-off arrangements may be used in place of the two variable reluctance pick-offs described above. For example the constraining ring may comprise the track of a variable resistance, with a contact roller fastened to the inner end of the probe member and making contact with the track when the probe deflects. This allows the direction of deflection to be measured directly.

An indicator of the type described above is equally sensitive for all directions of airflow. However the angle between the airflow. However the angle between the airflow and the fore-and-aft axis of the aircraft is usually small, and certain values are very important, for example values approaching the stall angle. The indicator described above is not very suitable for such purposes.

An indicator which is more suitable for use as a stall-warning instrument is described with reference to FIGURES 2 to 4. The same reference numerals as in FIGURE 1 have been used where appropriate.

Figure 2:
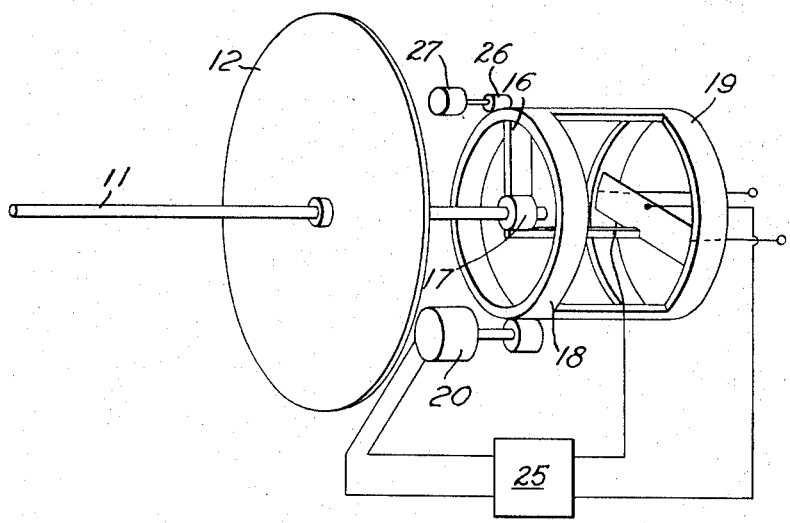
FIGURE 2 shows the main features of the preferred embodiment, in schematic form.

Referring now to FIGURE 2, a cylindrical probe member 11 is secured to a flexible diaphragm 12 which is fastened across a hole in the fuselage of the aircraft. The free end of the probe member 11 extends into the airstream and the other end is held by a flexible ligament 16 which connects a collar 17 on the probe member 11 to a rotatable annulus 18. The restrained end of the probe member 11 is contained within a housing (not shown) which also contains a pick-off potentiometer 19 the slider of which is operated by the end of the probe member 11. The output from the potentiometer is connected via a control unit 25 to a servo motor 20 which is operable to rotate the annulus 18 and hence the collar 17. The track of the potentiometer 19 is mechanically connected to the annulus 18 so as to rotate with it so that deflection of the potentiometer slider from a central position indicates the magnitude and direction of the deflection of the ligament 16. The potentiometer 19, control unit 25 and motor 20 make up the control means which operates to rotate the annulus 18.

It is necessary to provide some form of damping in a servo system of this type. One suitable form is shown in FIGURES 3 and 4 and comprises a pair of vanes moving in a damping medium such as oil. One vane 21 is fastened to the probe member 11 and extends along part of its length between the diaphragm 12 and the annulus 18. A second vane 22 of similar length extends parallel to the vane 21 and is fastened radially inside a cylindrical damping chamber 23. The chamber 23 is arranged substantially coaxial with the probe member 11 and is mechanically connected to the annulus 18 so that the vane 22 is approximately coplanar with the ligament 16 but on the opposite side of the probe member. The vane 21 fastened to the probe member 11 may be arranged relative to the vane 22 to allow for the maximum possible change in the direction of the airflow. Preferably, however, the vane 21 is arranged to be in the same diametral plane as the vane 22 when the instrument is in the null condition for that direction of the airflow in which the greatest interest lies. For example if the instrument is to be used as a stall-warning device, then the vanes are arranged to be coplanar when the angle of attack is close to the stalling value. This adjustment is made when the instrument is installed in the aircraft. The disposition of the vanes shown in FIGURES 3 and 4 is that when the instrument is in the null condition.

The damping chamber 23, or the whole of the instrument housing, is filled with oil.

The instrument operates as follows:

The free end of the probe member 11 is subject to drag forces due to the flow of air past it, and this end of the probe member will tend to move in the direction of the airflow shown by the arrow A (see FIG. 4). This will cause the probe member to pivot about the flexible diaphragm 12, and the "inboard" end of the probe member will tend to be deflected in the opposite direction. However, due to the presence of the supporting ligament 16, the end of the probe member held by the collar 17 may only move in a direction C perpendicular to the length of the ligament 16. The free end of the probe member will thus move in that direction, shown by the arrow B, perpendicular to the ligament 16 which contains a component of the drag force acting on the probe member.

Movement of the probe member also produces movement of the slider of the potentiometer 19 and a signal is applied to the control system which indicates the direction in which the ligament 16 has been deflected. The control system causes the servo motor 20 to rotate the annulus 18 in the appropriate direction shown by the arrow D until the ligament 16 is in tension, and thus extends parallel to the direction of airflow. The probe is then in an undeflected position and the slider of the potentiometer 19 will be central. The collar 17 rotates with the ligament 16 around the probe member 11. As the annulus rotates in the direction of the arrow D, the damping oil is moved by the vane 22 past the fixed vane 21 due to the rotation of the damping chamber 23. The drag of the oil on the vane 21 is proportional to the velocity of rotation of the vane 22 and acts in such a direction shown by the arrow E, as to tend to restore the probe member 11 to its undeflected position, and hence constitutes a form of stabilising feedback. It is to ensure that the fluid drag does constitute a stabilising force and not a positive feedback that the vane 22 is located on the opposite side of the probe member from the ligament 16.

The direction of flow of the airstream is then indicated by the direction of the ligament 16 from the collar 17 to the annulus 18. This direction may readily be determined by a suitable pick-off and displayed on a display device in a conventional manner. For example, the annulus 18 may be connected to a conventional gear train 26 to rotate a member 27 as diagramatically shown in FIG. 2.

The two parts of the probe member respectively inside and outside the fuselage are balanced to prevent deflection due to the acceleration forces acting on the instrument. The vane 21 also acts to prevent vibration of the probe member in the direction perpendicular to the ligament 16.

The potentiometer 19 used to control the servo motor 20 may be replaced by any other required form of pick-off which will indicate the direction and magnitude of the deflection of the probe member.

For example, if the deflection of the probe is very small and the potentiometer pick-off of FIGURE 2 thus unsuitable, the arrangement of FIGURE 5 may be used. This uses the restraining means of FIGURE 2 in conjunction with a variable reluctance pick-off of FIGURE 1. Since the end of the probe 11 is only able to move in one plane only a single pick-off 24 is used. The signal from the pick-off is used to cause rotation of the annulus 18 by the motor 20 until the ligament 16 is in tension and the probe deflection nullified as before. The damping system described above may be used with this arrangement.

In the above description the probe member 11 is described as being cylindrical in form. Other symmetrical shapes may be used so long as the probe does not introduce turbulence or eddy currents in the airstream. For example shapes such as a smooth cone of small apex angle, or a torpedo shape would be suitable.

There are many ways in which the mechanism described above may be constructed as a compact instrument. Its main advantage over known instruments is that there are no air passages and no rotating shaft projecting through the fuselage.

What we claim is:

1. An airflow direction indicator comprising a probe member, means for resiliently mounting said probe member such that one end of said probe member extends into the airstream substantially perpendicular thereto, said probe member being capable of limited deflectional movement under the influence of the drag force of the airstream, means for restraining the other end of said probe member to restrict the deflection of the probe member to a single plane containing a component of the drag force, control means for rotating said restraining means in response to deflection of the probe member to a position such that the deflection of the probe member is nullified and means for measuring the angle between the restraining means in the null position and a datum direction so as to indicate the direction of flow of the airstream.

2. An airflow direction indicator as set forth in claim 1 further including damping means for damping the movement of the probe member.

3. An airflow direction indicator as set forth in claim 1 wherein the restraining means comprises a collar surrounding said other end of said probe member, a rotatable annular ring, a resilient ligament extending inwards from the periphery of the ring, said ligament being adapted to support said collar in the center of the ring and capable of deflection only in a direction perpendicular to its length in the plane containing the ring.

4. An airflow direction indicator as set forth in claim 3 wherein said control means includes a motor operable to rotate the annular ring and a servo system operable to stop rotation of the ring when the only force acting on the resilient ligament is that of tension.

5. An airflow direction indicator as set forth in claim 3 wherein the measuring means is a pick-off rotatable with said annular ring.

6. An airflow direction indicator as set forth in claim 5 wherein said pick-off is a potentiometer.

7. An airflow direction indicator as set forth in claim 5 wherein said pick-off is a variable-reluctance device.

References Cited

UNITED STATES PATENTS

| | | | |
|---|---|---|---|
| 3,069,906 | 12/1962 | Eiland | 73—188 X |
| 3,108,473 | 10/1963 | Serra et al. | 73—188 |
| 3,208,276 | 9/1965 | Wood et al. | 73—188 X |
| 3,264,869 | 8/1966 | Erdely | 73—189 |

JAMES J. GILL, *Primary Examiner.*

RICHARD C. QUEISSER, *Examiner.*

J. JOSEPH SMITH, JERRY W. MYRACLE,
*Assistant Examiners.*